United States Patent
Guim Bernat

(10) Patent No.: US 12,450,065 B2
(45) Date of Patent: Oct. 21, 2025

(54) GLOBAL UNIFIED INTERDEPENDENT MULTI-TENANT QUALITY-OF-SERVICE PROCESSOR SCHEME

(71) Applicant: Intel Corporation, Santa Clara, CA (US)

(72) Inventor: Francesc Guim Bernat, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 791 days.

(21) Appl. No.: 17/559,969

(22) Filed: Dec. 22, 2021

(65) Prior Publication Data
US 2023/0195462 A1    Jun. 22, 2023

(51) Int. Cl.
G06F 9/30 (2018.01)
G06F 9/50 (2006.01)
G06F 11/30 (2006.01)

(52) U.S. Cl.
CPC ........ G06F 9/3016 (2013.01); G06F 9/30018 (2013.01); G06F 9/30038 (2023.08); G06F 9/5077 (2013.01); G06F 11/3051 (2013.01); G06F 2209/501 (2013.01); G06F 2209/508 (2013.01)

(58) Field of Classification Search
None
See application file for complete search history.

(56) References Cited

U.S. PATENT DOCUMENTS

| | | | |
|---|---|---|---|
| 9,369,489 B2 * | 6/2016 | Kato | H04L 63/20 |
| 9,703,834 B2 * | 7/2017 | Sityon | G06F 16/24564 |
| 9,898,351 B2 * | 2/2018 | Chaffin | G06F 9/52 |
| 10,601,804 B2 * | 3/2020 | Bakthavachalam | H04L 63/10 |
| 10,609,129 B2 * | 3/2020 | Lam | G06F 9/5077 |
| 11,032,263 B2 * | 6/2021 | Bakthavachalam | H04L 63/104 |
| 11,403,234 B2 * | 8/2022 | Durham | H04L 9/0894 |
| 11,416,295 B2 * | 8/2022 | Bernat | H04L 9/0827 |
| 12,010,036 B2 * | 6/2024 | Nevrekar | G06F 16/13 |
| 2003/0187908 A1 | 10/2003 | Boucher | |
| 2014/0298483 A1 * | 10/2014 | Kato | H04L 63/10 726/27 |
| 2015/0040187 A1 * | 2/2015 | Fujii | H04L 63/0876 726/3 |

(Continued)

FOREIGN PATENT DOCUMENTS

WO    WO-2014134673 A1 *    9/2014    ............. G06Q 30/02

OTHER PUBLICATIONS

Extended European Search Report , EP App. No. 22205988.3, May 22, 2023, 09 pages.

*Primary Examiner* — Steven G Snyder
(74) *Attorney, Agent, or Firm* — Nicholson De Vos Webster & Elliott LLP

(57) ABSTRACT

Embodiments of apparatuses, methods, and systems for a hierarchical multi-tenant processor scheme are disclosed. In an embodiment, a processor includes circuitry to execute threads, registers to store first values to define a tenant hierarchy, registers to store second values to specify a location of a thread corresponding to a tenant within the tenant hierarchy, and circuitry to include the second values in a request to access a resource. Use of the resource is to be monitored or controlled based on the location of the tenant within the tenant hierarchy.

15 Claims, 10 Drawing Sheets

(56) References Cited

U.S. PATENT DOCUMENTS

| | | | |
|---|---|---|---|
| 2015/0120703 A1* | 4/2015 | Sityon | G06F 16/24564 |
| | | | 707/722 |
| 2015/0120784 A1* | 4/2015 | Satoh | G06F 21/105 |
| | | | 707/802 |
| 2015/0304446 A1* | 10/2015 | Kato | H04L 41/08 |
| | | | 709/223 |
| 2016/0259807 A1 | 9/2016 | Factor et al. | |
| 2017/0185458 A1* | 6/2017 | Chaffin | G06F 9/52 |
| 2017/0244784 A1* | 8/2017 | Lam | G06F 9/5077 |
| 2019/0182226 A1* | 6/2019 | Bakthavachalam | H04L 63/10 |
| 2019/0391855 A1* | 12/2019 | Bernat | G06F 9/5088 |
| 2020/0177570 A1* | 6/2020 | Bakthavachalam | G06F 21/44 |
| 2020/0201671 A1* | 6/2020 | Samih | G06F 9/5011 |
| 2020/0201789 A1* | 6/2020 | Durham | H04L 9/0894 |
| 2022/0182333 A1* | 6/2022 | Nevrekar | H04L 67/10 |

* cited by examiner

US 12,450,065 B2

GLOBAL UNIFIED INTERDEPENDENT MULTI-TENANT QUALITY-OF-SERVICE PROCESSOR SCHEME

FIELD OF INVENTION

The field of invention relates generally to computer architecture, and, more specifically, to allocating shared resources.

BACKGROUND

Processor cores in multicore processors may use shared system resources such as caches (e.g., a last level cache or LLC), system memory, input/output (I/O) devices, and interconnects. The quality of service provided to applications may be unpredictable and/or suboptimal due to contention for these or other shared resources.

Some processors include technologies, such as Resource Director Technology (RDT) from Intel Corporation, who enable visibility into and/or control over how shared resources such as LLC and memory bandwidth are being used by different applications executing on the processor. For example, such technologies may provide for system software to monitor resource usage, allocate different amounts of a resource to different applications, and limit or otherwise control access to a resource.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
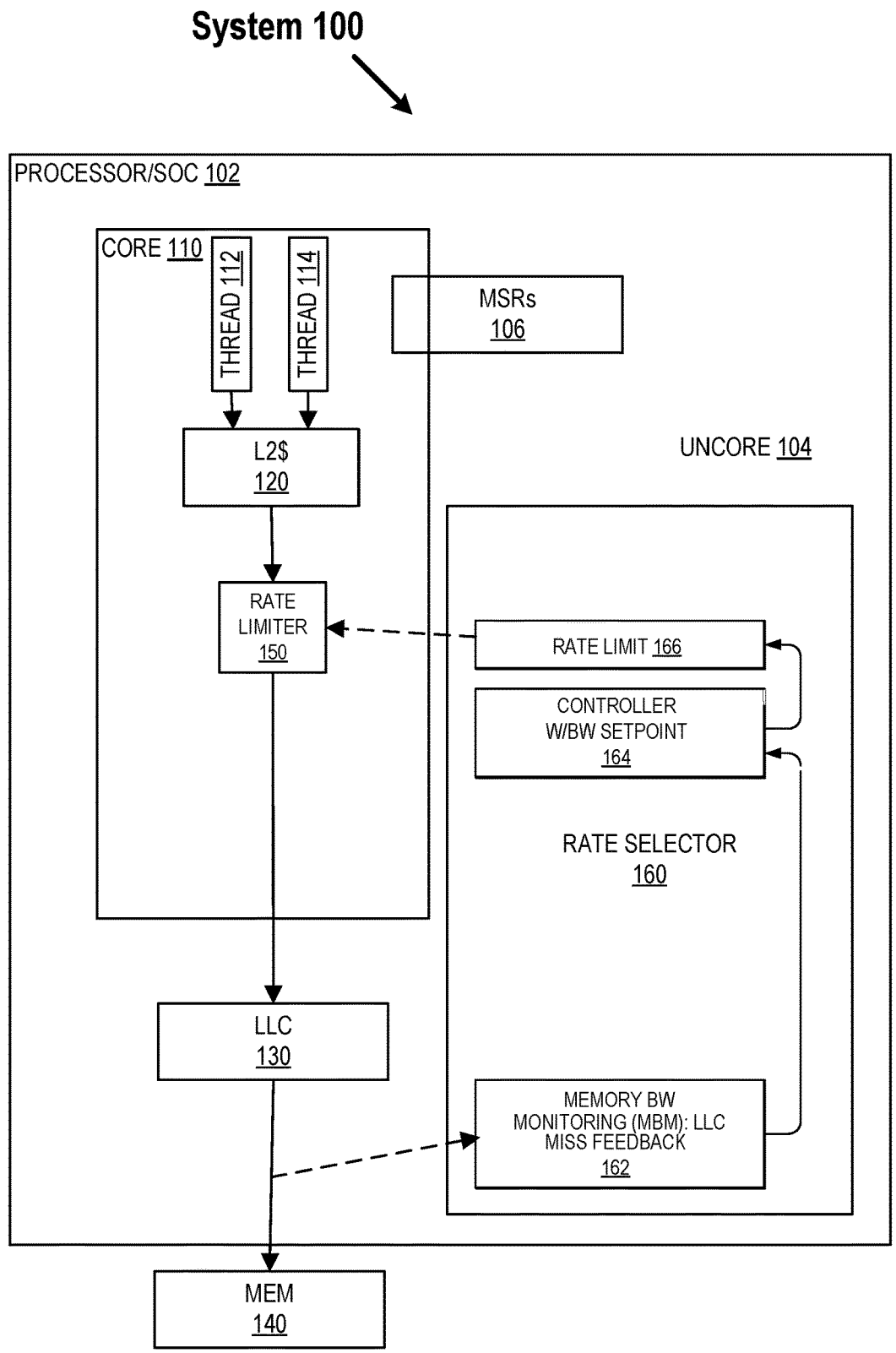
FIG. 1 is a block diagram of a system in which a processor-level QoS technique may be extended within a hierarchical tenancy scheme according to embodiments.

Embodiments, including an embodiment referred to as a GUIM QoS CPU Scheme (Global Unified Interdependent Multitenant quality-of-service central-processing-unit scheme) are described.

In the following description, numerous specific details are set forth. However, it is understood that embodiments may be practiced without these specific details. In other instances, well-known circuits, structures, and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

As used in this specification and the claims and unless otherwise specified, the use of the ordinal adjectives "first," "second," "third," etc. to describe an element merely indicates that a particular instance of an element or different instances of like elements are being referred to, and is not intended to imply that the elements so described must be in a particular sequence, either temporally, spatially, in ranking, or in any other manner. Also, as used in descriptions of embodiments, a "/" character between terms may mean that what is described may include or be implemented using, with, and/or according to the first term and/or the second term (and/or any other additional terms).

Also, the terms "bit," "flag," "field," "entry," "indicator," etc., may be used to describe any type or content of a storage location in a register, table, database, or other data structure, whether implemented in hardware or software, but are not meant to limit embodiments to any particular type of storage location or number of bits or other elements within any particular storage location. For example, the term "bit" may be used to refer to a bit position within a register and/or data stored or to be stored in that bit position. The term "clear" may be used to indicate storing or otherwise causing the logical value of zero to be stored in a storage location, and the term "set" may be used to indicate storing or otherwise causing the logical value of one, all ones, or some other specified value to be stored in a storage location; however, these terms are not meant to limit embodiments to any particular logical convention, as any logical convention may be used within embodiments.

In this specification and its drawings, the term "thread" and/or a block labeled "thread" may mean and/or represent an application, software thread, process, virtual machine, container, etc. that may be executed, run, processed, created, assigned, etc. on, by, and/or to a core.

The term "core" may mean any processor or execution core, as described and/or illustrated in this specification and its drawings and/or as known in the art, and the terms "processor core," "execution core," and "core" are meant to be synonymous. The term "uncore" may mean any circuitry, logic, sub-systems, etc. (e.g., an integrated memory controller (iMC), power management unit, performance monitoring unit, system and/or I/O controllers, etc.) in/on a processor or system-on-chip (SoC) but not within a core, as described and/or illustrated in this specification and its drawings and/or as known in the art (e.g., by the name uncore, system agent, etc.). However, use of the terms core and uncore in in the description and figures does not limit the location of any circuitry, hardware, structure, etc., as the location of circuitry, hardware, structure, etc. may vary in various embodiments.

For example, the term "MSR" may be used as an acronym for model or machine specific register, but may be used more generally to refer to and/or represent one or more registers or storage locations, one or more of which may be in a core, one or more of which may be in an uncore, etc. MSRs included in embodiments, as described below, may correspond to any one or more model specific registers, machine specific registers, etc. to control and report on processor performance, handle system related functions, etc. Accordingly, descriptions of embodiments including MSRs may not be limited to the use of MSRs as described; embodiments may in addition or instead use any other storage for control, configuration, state, etc. information. In various embodiments, MSRs (or any set or subset of MSRs) may or may not be accessible to application and/or user-level software. In various embodiments, MSRs (or any set or subset of MSRs) may be within and/or accessible by a core (core-scoped) or within an uncore and/or accessible by more than one core (package-scoped).

The term "quality of service" (or QoS) may be used to mean or include any measure of quality of service mentioned in this specification and/or known in the art, to an individual thread, group of threads (including all threads), type of thread(s), including measures of and/or related to performance, predictability, etc. The term "memory bandwidth monitoring" (or MBM) may be used to refer to a technique or the use of a technique to monitor memory bandwidth use (MBM may also be used to refer to a memory bandwidth monitor, hardware/firmware/software to perform memory bandwidth monitoring, as described below. The term "memory bandwidth allocation" (or MBA) may be used to refer to a technique or the use of a technique to allocate memory bandwidth and/or a quantity of memory bandwidth allocated, provided available, etc. or to be allocated, etc.

Embodiments of the invention may be used to in computer and information processing systems to allocate and/or enforce allocation of shared resources, such as caches and memory, and may provide improved performance and/or QoS when multiple tenants and/or threads with differing priorities are being and/or waiting to be executed. Embodiments may provide for monitoring and/or allocating any and/or any combination of shared core resources (e.g., simultaneous multithreading (SMT) resources, a cache dedicated to a core (e.g., a level 2 (L2) cache to which cache allocation technology (CAT) and/or code/data prioritization (CDP) techniques may be applied), a shared translation lookaside buffer (STLB)) and/or shared uncore resources (e.g., resources that may be shared/allocated according to any novel or known (RDT, etc.) techniques).

Embodiments may be used to provide a hierarchical scheme for resource monitoring, resource allocation, and/or any other QoS measurements and/or settings by a single central processing unit (CPU) or processor for any number of partitions, tenancy levels, and/or tenants. Aspects of embodiments may be implemented and/or included in a processor whether central or not; accordingly, the terms CPU and processor may be used interchangeably. Aspects of embodiments may be implemented and/or included in a CPU/processor in an SoC or any other system, such as, but not limited to, an SoC or system as shown in the drawings. Desirable features of embodiments may include a CPU-level approach to defining and supporting a tenant hierarchy for flexible tagging, monitoring, and allocating of resources; applying QoS techniques and policies; tracking usage for billing and liability purposes; etc.

As an example of a processor-level QoS technique that may be extended within a hierarchical tenancy scheme according to embodiments, FIG. 1 shows a block diagram of system 100, which includes a processor/SoC 102 and in which the allocated shared resource may be memory bandwidth (e.g., between a last level cache (LLC) and memory). In embodiments, the LLC may be fabricated on the same substrate (e.g., semiconductor chip or die, SoC, etc.) as processor/SoC 102 and the memory may be on one or more separate substrates and/or in one or more packages separate from the package containing the shared LLC; however, any arrangement and/or integration of shared resources (e.g., cache and/or memory) and users (e.g., cores and/or threads) in/on a substrate, chiplet, multichip module, package, etc. is possible in various embodiments.

The blocks shown in FIG. 1 may be implemented in logic gates and/or any other type of circuitry, all or parts of which may be integrated into the circuitry of a processing device or any other apparatus in a computer or other information processing system. For example, blocks shown in FIG. 1 may correspond to and/or be implemented in any of core 490 in FIG. 4B, processor 500 in FIG. 5, processors 610/615 in FIG. 6, processors 770/780 in FIGS. 7 and 8, and/or application processor 910 in FIG. 9, each as described below.

FIG. 1 shows threads 112 and 114 in/on core 110. LLC 130 and memory 140 may be shared by threads 112 and 114 and accessed by core 110 and its threads through level 2 (L2) cache 120. Embodiments may include any number of cores of any architecture (e.g., an embodiment may include a heterogeneous processor or system having cores of different architectures), with any number of threads per core (e.g., an embodiment may include a first core with and/or supporting a first number of threads and a second core with and/or supporting a second (which may be different from the first) number of threads.

FIG. 1 also shows MSRs 106, which may correspond to any one or more model specific registers, machine specific registers, etc., some of which may be specific to a processor or processor architecture (e.g., Intel® 64 and/or IA32) and some of which may be more specifically described below. For example, MSRs 106 may include one or more platform QoS registers (PQRs), each of which may be programmed/configured to be associated with threads (e.g., one core-scoped PQR per thread, with other core-scoped PQRs per logical processor in other cores). Each such PQR may also be programmed by software with a class of service (CLOS or COS) to be associated with a corresponding thread and to be used according to known techniques (e.g., as an RDT resource control tag) and/or as described below.

In embodiments, any individual, subset, or set of PQRs may be programmed and/or re-programmed (e.g., during context switches) to provide for desired configurations to be applied (e.g., per thread to be executed). Software may program each PQR with a CLOS value, which may be the same as or different from any of the other CLOS values, such that resources may be controlled based on CLOS values. To provide for this resource control, a processor may also include one or more programmable MSRs per CLOS that software may also program to define control policies per CLOS. As an example, a first set of MSRs (e.g., capacity bitmask or CBM MSRs) may be programmed to define which ways of a shareable cache (e.g., and last-level cache (LLC) or level 3 (L3) cache) may be used by threads of each CLOS. As another example, a second set of MSRs (e.g., MBA delay MSRs) may be programmed to define which MBA values (e.g., levels of delay or throttling) are to be used for threads of each CLOS. Other uses of CLOS values for resource control are possible.

FIG. 1 also shows a rate limiter 150, which may be programmable. Embodiments may include any number of rate limiters within any number of cores or within an uncore. In embodiments, rate limiters may limit use of a resource (e.g., memory bandwidth) by a corresponding core and/or thread, for example by limiting access by the core/thread to the resource based on time, based on a crediting scheme, etc. In embodiments, a throttling technique may be used to restrict or prevent access during one or more first periods within a second (larger than the first) period, while allowing or providing access during the remainder of the second period. Embodiments may provide for various granularities at which access may be restricted/prevented, for example, embodiments may provide for a throttling granularity of 10% such that a rate limiter may perform throttling to reduce MBA to any of 90%, 80%, 70%, etc. of full capacity.

In embodiments, for example in embodiments in which cores are connected through a mesh interconnect on which messaging may be managed or controlled using a crediting scheme, the crediting scheme may be used to limit the rate at which cores are able to pass messages such as memory access requests toward a memory controller. In these and/or other embodiments, as may be true of any circuitry included in embodiments, circuitry that performs rate limiting may be integrated into or with other circuitry of a processor, such as circuitry in or at an interface between a core and a mesh that connects to an integrated memory controller (e.g., indirectly through such interfaces associated with other cores) but be conceptually represented as a separate block in a drawing.

In these and/in other embodiments, throttling granularity as described above may be provided for configuration purposes and may be applied using a control mechanism that approximates the granularity, based on time, number of credits, etc. In embodiments, rate limit settings (e.g., throttling levels, delay values) may be applied to threads or cores through configuration or MSRs that may be configured by system software to map threads or cores to a CLOS and a CLOS to a rate limit setting. For example, throttling may be applied through a first MSR (e.g., IA32_PQR_ASSOC) that maps a thread to a CLOS and through a second MSR (e.g., IA32_L2_QoS_Ext_Thrtl_n) that maps a CLOS to a delay value.

In embodiments, a rate limiter may be set and/or provided with a setting (e.g., of a rate limit, throttling level, or delay value) by a rate selector 160. As is the case for rate limiters, embodiments may include any number of rate selectors. In embodiments, rate selectors may include circuitry and/or other hardware which may be configured by, programmed by, and/or used with and/or instead of software/and or firmware.

In embodiments, a rate selector may include hardware, firmware, and/or software providing a monitoring capability (further described below) to determine whether its associated core/thread is overutilizing memory bandwidth and hardware and/or software providing a rate setting capability to set and adjust rate limits for cores/threads that are overusing bandwidth or consuming less than they are allocated. For example, if a measurement from the monitoring capability indicates that memory bandwidth demand is higher than a prescribed memory bandwidth demand, a first MBA rate setting may be selected, where the first MBA rate setting is limited and slower than a second MBA rate setting (e.g., unlimited, unthrottled), that may be otherwise selected and/or used.

In embodiments, settings (e.g., delay values) may be determinable and/or selectable per thread and/or per core (e.g., depending on the placement of the rate limiter). Embodiments may provide for determining and/or selecting settings per thread and per core and may provide programmability for software to choose from a number of ways to select a per core setting based on determined/desired per thread settings. For example, the per core setting may be the maximum determined/desired per thread setting for any in the core (e.g., max(delayValue(CLOS[thread0]),delayValue(CLOS[thread1]))), the minimum determined/desired per thread setting for any in the core (e.g., max(delayValue(CLOS[thread0]), delayValue(CLOS[thread1]))), etc. Such embodiments may provide a default (e.g., the maximum).

In embodiments, a rate selector may be part of a feedback loop that includes input to the rate selector from a point downstream of (i.e., further from the source than) the rate limiter. For example, a rate selector may receive input from and/or related to an interface between an LLC and memory, as shown in FIG. 1.

In FIG. 1, rate selector 160 includes memory bandwidth monitor (MBM) 162 to monitor (e.g., using a technology, such as RDT, that enables visibility into how LLC and/or memory bandwidth are being used by different applications executing on the processor) one or more indicators of memory bandwidth demand and/or use per thread and/or per core, such as an LLC cache miss rate. MBM 162 may provide this information to controller 164. Controller 164 may use this information along with a bandwidth setpoint to determine rate limit 166, which may be provided to a rate limiter for use as described above.

An MBM and its use are described above as an example; however, MBMs and their use according to embodiments is not limited to the above description. Furthermore, embodiments are not limited to monitoring and/or allocation memory bandwidth; they may include monitoring and/or allocating of and/or any combination of resources and/or applying and supporting any QoS techniques. Embodiments may be implemented in CPUs, processors, and cores that support any new or existing instruction set architecture (ISA) and/or may include one or more new instructions in and/or extensions to an existing ISA.

Figure 2:
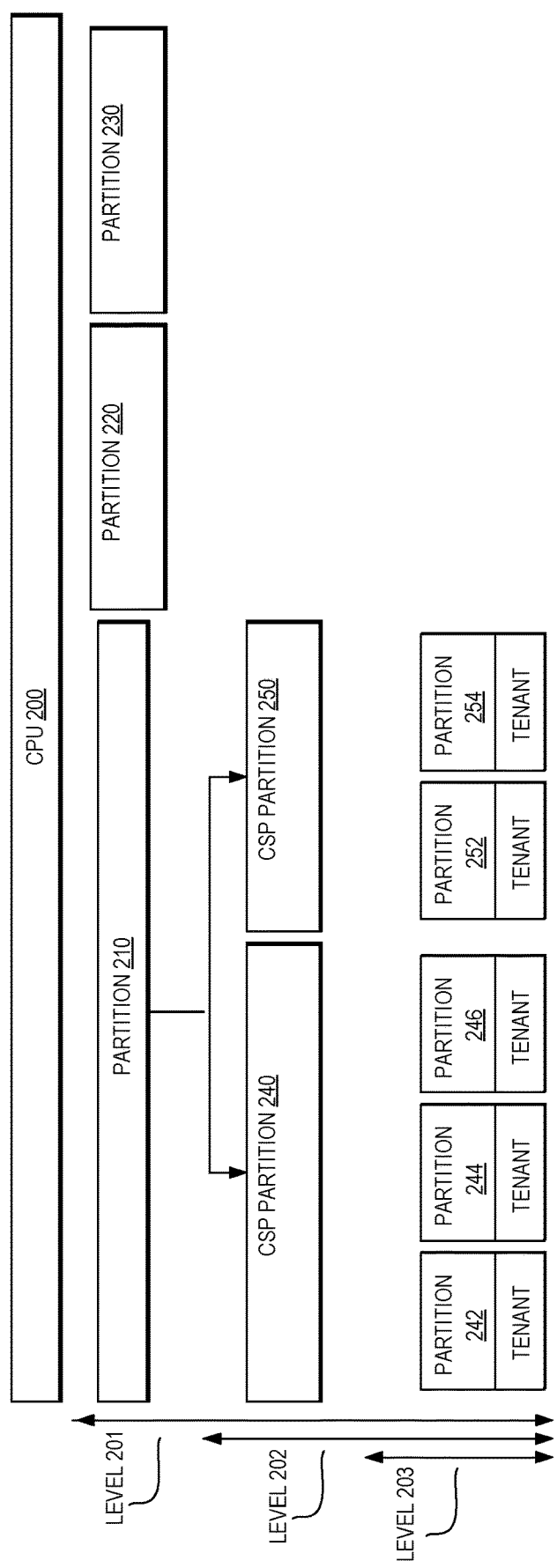
FIG. 2 is block diagram representing a tenant hierarchy supported by a CPU according to embodiments.

Embodiments may provide a CPU-level approach to defining and supporting a tenant hierarchy for flexible monitoring/allocating of resources and/or applying QoS techniques/policies. As an example of a tenant hierarchy according to embodiments, FIG. 2 shows three levels of tenancy that may be supported by a single CPU 200.

In this example, the owner and/or operator of the system may divide the system into partitions. Partition 210 may include resources to rent to third parties. Partition 220 may be used to execute the owner/operator's own workloads such as operating and managing the system and its traffic. Partition 230 may be used to execute workloads for customers/tenants to be directly managed by the owner/operator.

The tenant hierarchy includes three levels of tenancy that may exist within partitions, shown as first level 201, second level 202, and third level 203. First level 201 may be available to be used (e.g., partition 220) or managed (e.g., partitions 210 and 230) by the owner/operator. As such, first level 201 is shown as overlapping with second level 202 and third level 203 because the owner/operator owns the end-to-end infrastructure, including real state, networking, and compute.

Second level 202 may be available to or for customers/tenants. For example, second level 202 within partition 210 may be divided into sub-partitions, such as sub-partitions 240 and 250. Sub-partitions may be rented to tenants such as a cloud service provider (CSP). A CSP may further divide a sub-partition (e.g., sub-partition 240 or 250) to provide, within third level 203, resources, services, etc. to its own customers/tenants (e.g., sub-partitions 242, 244, and 246 of sub-partition 240; sub-partitions 252 and 254 of sub-partition 250). Similarly, second level 202 within partition 230 may be rented to providers of specific edge services such as content delivery and augmented reality.

A tenant hierarchy scheme such as shown in FIG. 200 and/or other tenant hierarchy schemes according to embodiments provide for a system owner/operator to manage (e.g., monitor/allocate resources, apply QoS techniques/policies), with a single CPU, all tenancy levels in the system, and/or for a tenant to own/operate/manage a virtual system (e.g., resources and/or a partition or sub-partitions) at its own tenancy level and all tenancy levels below it.

In this description, an owner/operator of a partition at the highest tenancy level may be referred to as the tenant of the partition and also as the owner of the tenant(s) in sub-partition(s) directly below it. As such, a single owner/operator of a system may be considered to be multiple tenants and/or owners. For example, in FIG. 2, the owner/operator of the system may be considered to be a first tenant (the first level (or level 1) tenant of partition 210), a second tenant (the first level tenant of partition 220), a third tenant (the first level tenant of partition 230), and the owner of the tenants in partitions 240 and 250. Each tenant at levels below the highest level may be considered to be a tenant of its owner, and if it has its own tenant(s), the owner of its tenant(s). For example, in FIG. 2, the tenant in sub-partition 240 may be considered to be a tenant of the first level tenant of partition 210, and the owner of the tenants in sub-partitions 242, 244, and 246.

Figure 3A:
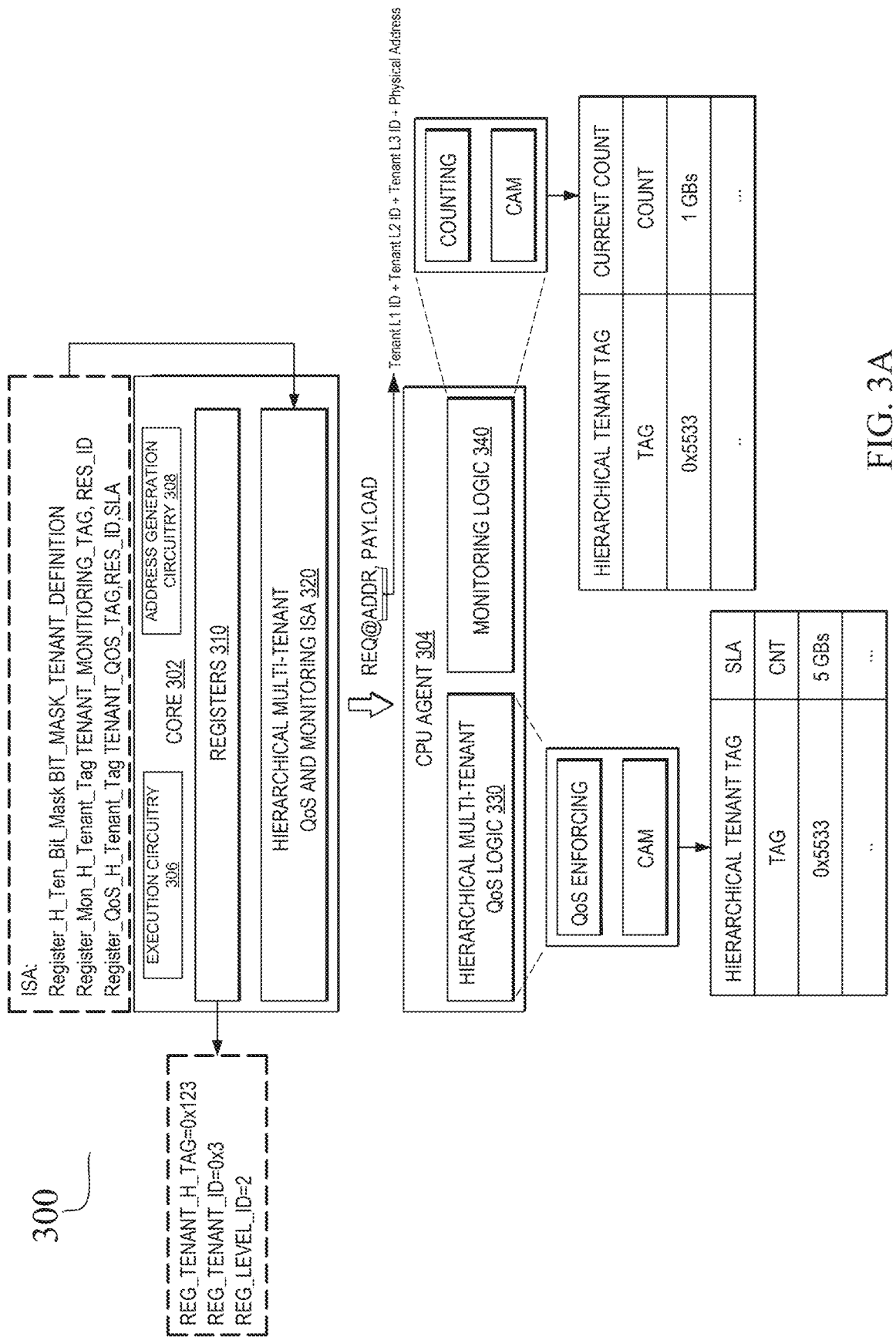
FIG. 3A is a block diagram representing an architecture according to embodiments.

Aspects of embodiments are shown in FIG. 3A, which represents architecture 300 including core 302 and CPU agent 304. The blocks shown in FIG. 3A may be implemented in logic gates and/or any other type of circuitry, all or parts of which may be integrated into the circuitry of a processing device or any other apparatus in a computer or other information processing system. For example, blocks shown in FIG. 3A may correspond to and/or be implemented in any of core 490 in FIG. 4B, processor 500 in FIG. 5, processors 610/615 in FIG. 6, processors 770/780 in FIGS. 7 and 8, and/or application processor 910 in FIG. 9, each as described below In FIG. 3A, core 302 includes execution circuitry 306, address generation circuitry 308, and registers 310, and supports ISA 320 according to embodiments. CPU agent 304 may represent any agent to and/or in which to implement aspects of embodiments, such as but not limited to a last level cache (LLC), an Intel® Data Streaming Accelerator (DSA), or a memory controller (MC), and includes hierarchical multi-tenant QoS logic 330 and monitoring logic 340.

Registers 310 may represent one or more MSRs or any other registers or other storage and may correspond to MSRs 106 in FIG. 1 or a subset or superset of MSRs 106 in FIG. 1. Registers 310 may include a register to store a definition of the topology of the tenant hierarchy. This register may be referred to as a tenant mask register. It may be writable with a dedicated instruction to define the topology of the tenant hierarchy, with an MSR write instruction, or with another type of write instruction.

In embodiments, the topology of the tenant hierarchy may be defined with a bitmask that specifies the different levels or tiers of tenancy and a maximum number of tenants per level. Within the bitmask, consecutive bits of the same value may correspond to a particular level and a change from one value to a different value may indicate a change to a different level. The number of consecutive bits of the same value may correspond to the maximum number of tenants per level per owner (e.g., for 'n' consecutive bits per level, the maximum number of tenants in the first level is 2 to the nth power ($2^n$), and the maximum number or tenants per owner in the other levels is $2^n$ minus 1, as further described below.

For example, using a bitmask having a length of nine (with a bit order from lowest on the right to highest on the left), a bitmask value of '111001111' defines three levels, wherein a first or highest level (e.g., for a system owner/operator) uses three bits (indicated by the highest order string of ones), a second or middle level (e.g., for a CSP, other service provider, or other virtual system owner/operator) uses two bits (indicated by the string of zeroes), and a third or lowest level (e.g., for tenants of a CSP) uses four bits (indicated by the lowest order string of ones). In this example, the maximum number of tenants in the first level is eight ($2^3$), the maximum number of second level tenants per owner (i.e., per first level tenant) is three ($2^2$ minus 1), and the maximum number of third level tenants per owner (i.e., per second level tenant) is fifteen ($2^4$ minus 1).

In this description, the bits in the bitmask corresponding to a first level may be referred to as tenant L1 bits (in the example above, bit positions 8:6, having a value of '111'), the bits corresponding to a second level may be referred to as tenant L2 bits (in the example above, bit positions 5:4, having a value of '00'), the bits corresponding to a third level may be referred to as tenant L3 bits (in the example above, bit positions 3:0, having a value of '1111'), etc.

As another example, using a bitmask having a length of seven, a bitmask value of '1110000' defines two levels, wherein a first or highest level uses three L1 bits (the string of ones) and a second or lowest level uses two L2 bits (the string of zeroes). In this example, the maximum number of tenants in the first level is eight ($2^3$) and the maximum number of second level tenants per owner (i.e., per first level tenant) is fifteen ($2^4$ minus 1).

In embodiments, a thread may be mapped to an owner (e.g., with a tag) and assigned a unique identifier (ID) within a tenancy level (as further described below). The owner tags and thread IDs are used to identify each thread and its owner in the tenancy hierarchy. For convenience, an owner tag concatenated with the thread identifier may be referred to as a tenant ID.

For example, for a nine-bit bitmask that specifies the topology of the tenant hierarchy as described above, a tenant ID may have a length of nine bits, with bits 8:6 (L1 bits) available to uniquely identify eight first level tenants, bits 5:4 (L2 bits) available to uniquely identify three second level tenants per first level tenant, and bits 3:0 (L3 bits) available to uniquely identify fifteen third level tenants per second level tenant. For each of the second and third levels, one bitstring value may be reserved to indicate that the tenant ID is to uniquely identify a tenant one level above the reserved bitstring, as described by example below.

Continuing this example with more specific examples, where the reserved bitstring value described above is all zeroes, the three L1 bits in a tenant ID may be used to identify one of eight possible first level tenants (from '000' to '111'). Each first level tenant may have up to three second level tenants, with each second level tenant assigned a tenant ID having the L1 bits of its owner concatenated with its own L2 bits (from '01' to '11'). For convenience, concatenation may be indicated with the '+' symbol (e.g., L1+L2 or 001+01)

The L2 bit value '00' is reserved to indicate that a corresponding tenant ID refers to a first level tenant alone (and not to any of its tenants, if any) and may be used, for example, to associate that tenant with a QoS policy (e.g., a service-level agreement (SLA), such as an SLA specifying a resource or share of a resource) at the first level. Examples of tenant IDs, with the L3 bits as described below), are:

000+01+L3 refers to the second level tenant 01 owned by first level tenant 000
000+10+L3 refers to the second level tenant 10 owned by first level tenant 000
001+00+L3 refers to the first level tenant 000 alone
001+01+L3 refers to the second level tenant 01 owned by first level tenant 001
001+00+L3 refers to the first level tenant 001 alone Each second level tenant may have up to fifteen third level tenants, with each third level tenant assigned a tenant ID having the L1+L2 bits of its owner concatenated with its own L3 bits (from '0001' to '1111'). The L3 bit value '0000' is reserved to indicate that a corresponding tenant ID refers to a second level tenant alone and may be used, for example, to associate that tenant with a QoS policy at the second level. Examples of tenant IDs are:

000+01+0001 refers to the third level tenant 0001 of second level tenant 01 of first level tenant 000
000+01+0010 refers to the third level tenant 0010 of second level tenant 01 of first level tenant 000
000+01+0000 refers to the second level tenant 01 of first level tenant 000, alone The tenant bitmask and ID scheme described above may be used, according to embodiments, to define a tenant hierarchy, to uniquely identify every tenant within the hierarchy, to identify the owner of every tenant (and the owner of each owner), to associate each tenant and/or each tenant's owner with resources and QoS policies, and to identify each separate QoS policy applicable to each tenant and each owner above it in the hierarchy. This scheme is an example that may be used in one or more embodiments. Other schemes, aspects of which may be described below, are possible in other embodiments.

A core (e.g., core 302) generating a request (e.g., to access memory) to or through an uncore will include a tenant ID concatenated with the address (e.g., physical address) for the request. The concatenation of tenant IDs with addresses is performed by hardware (e.g., address generation circuitry 308) in the core, so application software does not need to be aware of its tenancy level or tenant ID.

In embodiments, system software (e.g., an operating system (OS)) may register different levels of QoS enforcement (which may be incremental) within the levels of tenancy for different CPU resources. For example, a partition within a first tenancy level may be allocated 10 GB per second (GB/s) of memory bandwidth, divided into two sub-partitions in a second tenancy level (e.g., a first sub-partition with 8 GB/s of the partition's 10 GB/s and a second sub-partition with the remaining 2 GB/s or the partition's 10 GB/s), with the first sub-partition further divided into two sub-partitions in a third tenancy level (e.g., a third sub-partition with 6 GB/s of the first sub-partition's 8 GB/s and a fourth sub-partition with the remaining 2 GB/s of the first sub-partition's 8 GB/s).

In embodiments, when a request from a core (e.g., core 302) arrives at a resource or an agent (e.g., CPU agent 304) controlling a resource, QoS logic 330 checks the tenant ID in the request's address to determine if a QoS policy (e.g., an SLA specifying the share of the resource (e.g., memory bandwidth) allocated to the tenant) is established for any of the levels associated with the request and applies enforcement if needed. If a QoS policy is established for more than one of the associated levels, the most restrictive policy is used. For example, for a three-level hierarchy, the QoS logic will check for a first level SLA using the tenant ID L1 bits from the address used in the request, check for a second level SLA using the tenant ID L1 and L2 bits from the address, and check for a third level SLA using the tenant ID L1, L2, and L3 bits from the address.

In embodiments, demand for and/or use of a resource by a tenant, group of tenants, level or tier of tenancy, partition, etc. may be monitored/measured dynamically with hardware (e.g., a leaky bucket controller in or accessible to QoS logic 330). For example, QoS logic 330 may include a leaky bucket counter which may generate an output signal to indicates whether a usage threshold or allocation of usage credits for a resource has been exceeded. The leaky bucket counter may receive an input signal that indicates whether an access to or usage of a resource (e.g., from/by a tenant) has occurred, such that the leaky bucket counter may be incremented for each such occurrence (thus "adding water to the bucket"). The leaky bucket counter may also be decremented (by the same or a different amount with/than which it is incremented) for each occurrence of the expiration of a time window (thus "leaking water from the bucket"). Therefore, a leaky bucket counter may provide a dynamic indication of use/demand, which may be used to determine/select/adjust a rate used or to be used by a tenant, group of tenants, level or tier of tenancy, partition, etc. One or more leaky bucket counters may be used with one or more programmable values per counter.

Alternative tenant bitmask and ID schemes in which all bit combinations in all tenancy levels are available to identify tenants (i.e., no values are reserved) may be possible by providing for instructions or functions to use (e.g., as operands) variable length tenant IDs or tags such that the level to which the instruction or function applies is implied by the length of the ID or tag. For example, with the nine-bit mask (111001111) described above, the use of a three-bit ID or tag (L1 bits) may correspond to performing the function (e.g., associating a thread and a resource, associating a thread and a QoS, etc.) at or based on the first level only, the use of a five-bit ID or tag (L1+L2 bits) may correspond to performing the function at or based on the first and second level only, and the use of a nine-bit ID or tag (L1+L2+L3 bits) may correspond to performing the function at or based on all three levels.

Alternative tenant and bitmask ID schemes in which all bit combinations in all tenancy levels are available to identify tenants (i.e., no values are reserved) may be possible by concatenating, along with a tenant ID, a tenancy level with the address of a request, such that the tenancy level may be used to determine at which level or levels a function (e.g., determining which QoS policy applies and/or enforcing it) is to be performed.

Registers 310 may also include any number of registers which may be programmed/configured to be associated with any number of threads or thread contexts, in order to specify, for each of any number of threads, the tenancy level of the thread, the ownership hierarchy above the thread, and/or the tenant ID of the thread. The information in these registers is used by hardware in the core to generate the corresponding address (i.e., including the tenant ID) for requests, as described above. In embodiments, any individual, subset, or set of these registers may be programmed and/or re-programmed (e.g., to provide for desired configurations to be applied and/or changed) and/or may be saved and restored (e.g., in connection with context switches).

For example, as shown in FIG. 3A:
REG_TENANT_H_TAG includes all the bits that identify the hierarchical tenant trace for that particular thread. For instance, if this thread is mapped into level three of tenancy, this TAG will include Tenant Level 1 ID+Tenant Level 2 ID.
REG_TENANT_ID includes the ID for the tenant on the level of the hierarchy where it is mapped.
REG_LEVEL_ID identifies the current level where the tenant belongs.

In embodiments, a thread may access REG_TENANT_ID and REG_LEVEL_ID but not REG_TENANT_H_TAG, and only privileged software or a privileged software stack may access REG_TENANT_H_TAG. In embodiments, a baseboard management controller (BMC) could modify REG_TENANT_ID, REG_LEVEL_ID, and/or REG_TENANT_H_TAG via an out-of-bound management architecture.

Embodiments may include new instructions and/or an ISA extension (e.g., ISA 320 in FIG. 3A) to allow for software (e.g., system or other privileged software) to program the tenant mask register, the tenant ID registers, registers to associate each tenant with resources and QoS policies, registers to associate resources with QoS policies, etc. Instead of or in addition to such instructions, embodiments may provide for hardware to perform functions such defining the topology of the tenant hierarchy, assign tenant IDs, associate tenants with resources and QoS policies, associate resources with QoS policies, etc. in response to other events, such as the programming of one or more MSRs (e.g., by system or other privileged software). Some examples of such instructions, shown in FIG. 3A, and/or functions are described below.

A first instruction may have a 'Register_H_Ten_Bit_Mask BIT_MASK_TENANT_DEFINITION' format, wherein 'Register_H_Ten_Bit_Mask' represents an opcode and 'BIT_MASK_TENANT_DEFINITION' represents an operand or operand location to specify or indicate a bitmask. This instruction or function may be used to define the topology of the hierarchy (e.g., by programming the tenant mask register).

A second instruction may have a 'Register_Mon_H_Tenant_Tag TENANT_MONITORING_TAG, RES_ID' format, wherein 'Register_Mon_H_Tenant_Tag' represents an opcode, 'TENANT_MONITORING_TAG' represents a first operand or operand location to specify or indicate a monitoring tag, and 'RES_ID' represents a second operand or operand location to specify or indicate a resource ID. This instruction or function may be used to register a monitoring tag identifying a tenant in a level for a resource ID. The resource ID is a unique identifier that identifies a resource within the CPU (e.g., LLC, memory bandwidth, etc.)

In embodiments, the monitoring tag may be a tenant ID. In embodiments, the monitoring tag may imply that monitoring is to be performed up to a certain level of tenancy by including all the tenant hierarchical IDs up to a certain point.

For example:
Monitoring Tenant (and all its subtenants) 0x43 at Level 2 corresponds to registering a tag created by Level 1 ID Tenant (that owns Tenant 0x43)+0x43.

Note that this implies that all the traffic generated by any subtenant for 0x43 will be accumulated in a single monitoring entry. If, for instance, the tenant with ID 0x51 (belonging to the partition of tenant 0x43) mapped at Level 3 is to be specifically monitored, the following tag may be registered:
Level 1 ID Tenant (that owns Tenant 0x43)+0x43+0x51

A third instruction may have a 'Register_QoS_H_Tenant_Tag TENANT_QOS_TAG, RES_ID, SLA' format, wherein 'Register_QoS_H_Tenant_Tag' represents an opcode, 'TENANT_QOS_TAG' represents a first operand or operand location to specify or indicate a QoS tag, 'RES_ID' represents a second operand or operand location to specify or indicate a resource ID, and 'SLA' represents a third operand to operand location to specify or indicate an SLA or other QoS policy. This instruction or function may be used to register a QoS to a tag identifying a tenant in a level for a resource ID. The resource ID is a unique identifier that identifies a resource within the CPU (e.g., LLC, memory bandwidth, etc.)

For instance, building on the example above, to enforce 10 GB/s of memory bandwidth to Tenant (and all its subtenants) 0x43 at Level 2:
TENANT_QOS_TAG=Level 1 ID Tenant (that owns Tenant 0x43)+0x43
SLA=10 GB/s Note that this implies that all the traffic generated by any subtenant for 0x43 will be controlled and/or throttled as a single tenant. If, for instance, the tenant with ID 0x51 (belonging to the partition of tenant 0x43) mapped at Level 3 is to have a specific SLA, the following tag may be registered:
TENANT_QOS_TAG=Level 1 ID Tenant (that owns Tenant 0x43)+0x43+0x51
SLA=6 GB/s Note that in this later case, at this particular level the rest of the tenants will have to share the other 4 GB/s of memory bandwidth unless it is divided using other registrations. Hardware (e.g., automatically) and/or software (e.g., by programming model restrictions) may prevent a registration from violating the ones at higher levels in the hierarchy. For instance, the total of memory bandwidth divided among subtenants at Level N+1 may not be allowed to be higher than the amount of memory bandwidth allocated to the Level N owner of these subtenants.

Note that multiple registrations may match a tenant request. For instance, in the previous example, for tenant 0x51 the QoS rules that would be applied for QoS is the later one because it is specific to that tenant.

In embodiments, each of the agents, resource controllers, and/or resources (represented as CPU agent 304 in FIG. 3A) within the CPU (e.g., memory controller, intra-die-interconnect (IDI) interface, LLC, etc.) that can potentially track tenant access to resources (e.g., memory bandwidth, caches misses, etc.) may include telemetry circuitry and/or logic (represented as monitoring logic 340 in FIG. 3A) to perform such tracking. Such circuitry/logic may include circuitry/logic to track requests from a tenant to the resource and update the corresponding performance monitoring data for that function (each resource will have different metrics).

Such circuitry/logic may also include circuitry/logic to store the telemetry data per each of the tenants. For example, this circuitry/logic may be a content-addressable memory (CAM) based type of structure indexed by the function ID and the particular metric to be tracked. In case of overflow for a particular metric and function, the tracking logic may generate an overflow signal back to the performance monitoring logic.

In embodiments, telemetry data of a tenant may or may not be accessible by other tenants, and/or a tenant may be able to specify whether/which other tenants (e.g., an owner of the tenant) may have access to telemetry data of the tenant. For example, telemetry data of a CSP tenant may not be accessible to the CSP, or the CSP tenant may be able to specify whether or not it is accessible to the CSP.

This tracking is performed based on registration (e.g., as described above). Hence, when a request arrives with memory address, the logic will find all the different entries that may match that request. For instance, for a tenant at the third level, the logic will look for three tags (one at each level) by extracting the following bits (e.g., from the tenant ID using the tenant mask):

Level 1 ID bits
Level 1 ID bits+Level 2 ID bits
Level 1 ID bits+Level 2 ID bits+Level 3 ID bits The logic will update any monitoring entry matching any of the three previous entries.

In embodiments, each of the agents, resource controllers, and/or resources (represented as CPU agent 304 in FIG. 3A) within the CPU (e.g., memory controller, IDI interface, LLC, etc.) that can potentially control or affect access to resources (e.g., memory bandwidth, etc.) may include QoS circuitry and/or logic (represented as QoS logic 330 in FIG. 3A) to perform enforcement of QoS policies. Such circuitry/logic may include circuitry/logic to track requests from a tenant to the resource and update the corresponding performance monitoring data for that function (each resource will have different metrics).

For example, QoS logic 330 may include circuitry/logic to check the tenant ID in a request's address to determine if a QoS policy is established for the tenant at any of the levels associated with the request (e.g., by extracting the applicable bits as described above for monitoring logic 340) and circuitry/logic to apply enforcement if needed. If a QoS policy is established for more than one of the associated levels, the most restrictive policy is used. Enforcement may include holding requests (e.g., in a request queue) until allocation of the resource becomes available to a tenant (and possibly all of its subtenants).

In embodiments, the CPU propagates the tenant IDs to the various resources and/or controllers of resources that may be monitored, allocated, etc. Intra-die and inter-die interconnect request formats, packet formats, protocols, etc. may be expanded and/or changed in order to propagate tenant IDs as part of requests.

In some embodiments, a hierarchical tenancy architecture may be managed by the system software stack. In other embodiments, a virtualized nested approach is possible. For example, each partition may be allowed to manage the partitions underneath it. In this approach, hardware and/or software may be used to prevent tenants under a given partition from violating policies enforced by upper tenants (e.g., the operator).

Figure 3B:
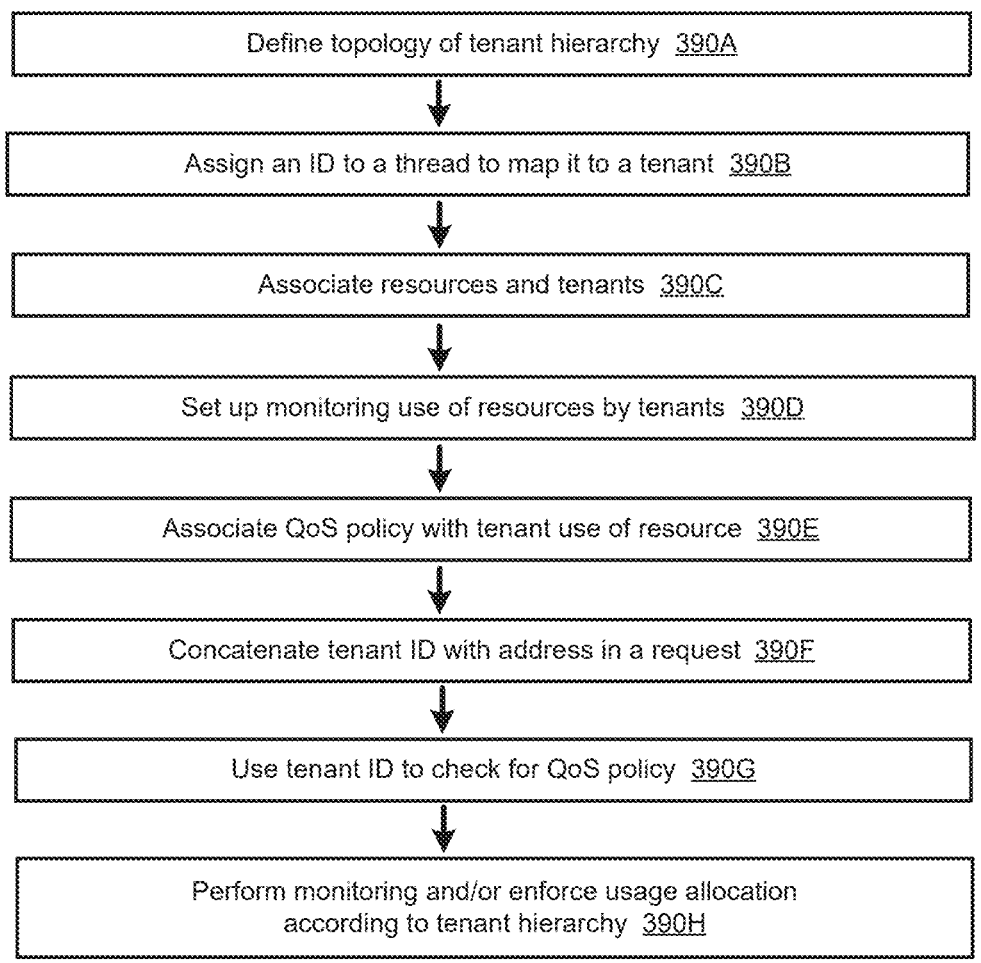
FIG. 3B is a flow diagram illustrating a method illustrating the establishment and use of a hierarchical multi-tenant quality-of-service scheme according to embodiments.

FIG. 3B is a flow diagram of method 390, an example of a method illustrating the establishment and use of a CPU-based hierarchical multi-tenant QoS scheme according to embodiments, which may be used to illustrate the operation of one or more units, elements, blocks, etc. of hardware according to embodiments such as that shown in FIG. 3A. The numbering and arrows in FIG. 3B are for ease of description and do not necessarily require particular ordering, sequencing, or correspondence of blocks and/or items.

In method block 390A, the topology of a tenant hierarchy is defined, e.g., by programming a CPU register with a tenancy bitmask. In method block 390B, a thread is assigned an ID to map it to a partition and/or level within the tenant hierarchy, e.g., by programming one or more CPU registers with one or more specification/indication of an owner tag, thread or tenant IDs, and/or a tenancy level. In method block 390C, one or more resources are associated and/or allocated to one or more threads, tenants, and/or tenancy levels/partitions, e.g., by programming one or more CPU registers with one or more specifications/indications of a thread/tenant ID and a resource ID. In method block 390D, monitoring use of one or more resources by one or more threads/tenants/levels/partitions is set up, e.g., by programming one or more CPU registers with one or more specifications/indications of a thread/tenant ID and a resource ID. In method block 390E, one or more QoS policies are associated with the use or allocation of one or more resources by one or more threads/tenants/levels/partitions, e.g., by programming one or more CPU registers with one or more specifications/indications of a thread/tenant ID, a resource ID, and a QoS policy or SLA.

In method block 390F, a tenant ID is concatenated (e.g., by processor core 302) with an address for (or other identification of a resource to fulfill) a request (e.g., a request involving use of a resource). In method block 390G, the tenant ID and/or the tenant hierarchy is used to check (e.g., by CPU agent 304) for one or more monitoring, usage, allocation, or other policies associated with the use of the resource by the tenant or any other relevant tenant (e.g., the owner of the tenant, a different tenant of the owner, the owner of the owner). In method block 390H, monitoring is performed and/or usage allocation is enforced (e.g., by CPU agent 304) according to the tenant hierarchy (e.g., monitoring is performed at one or more particular tenancy levels, the most restrictive policy is enforced, etc.).

In various embodiments, any one or more method blocks may be rearranged, added, omitted, etc. For example, embodiments may include, in various orders, any of associating one or more threads/tenants/levels/partitions with one or more resources, associating one or more threads/tenants/levels/partitions with one or more resource monitoring policies, associating one or more threads/tenants/levels/partitions with one or more resource allocation policies, associating one or more threads/tenants/levels/partitions with one or more QoS policies and/or SLAs, associating one or more resources with one or more resource monitoring policies, associating one or more resources with one or more resource allocation policies, associating one or more resources with one or more QoS policies and/or SLAs, monitoring use of one or more resources by one or more threads/tenants/levels/partitions, enforcing allocation of one or more resources to one or more threads/tenants/levels/partitions, etc.

In embodiments, a processor includes circuitry to execute threads, registers to store first values to define a tenant hierarchy, registers to store second values to specify a location of a thread corresponding to a tenant within the tenant hierarchy, and circuitry to include the second values in a request to access a resource. Use of the resource is to be monitored or controlled based on the location of the tenant within the tenant hierarchy.

Any such embodiments may include any or any combination of the following aspects. At least one of the second one or more values may be to identify the tenant. At least one of the second one or more values may be to identify an owner of the tenant. At least one of the second one or more values may be to identify a level in the tenant hierarchy of the tenant. At least one of the first one or more values may include a plurality of bitstrings, wherein each of the plurality of bitstrings corresponds to a level in the tenant hierarchy. The plurality of bitstrings may include at least one bitstring of consecutive ones and at least one bitstring of consecutive zeroes. The one or more second values included in the request may be to be used by an agent to determine the location of the tenant in the tenant hierarchy, wherein the agent is to monitor use of the resource by the thread. The one or more second values included in the request may be to be used by an agent to determine the location of the tenant in the tenant hierarchy, wherein the agent is to control use of the resource by the thread. The processor may also include a decoder to decode an instruction to program the first one or more registers, the instruction having a format including an operand to indicate at least one of the first one or more values. The processor may also include a decoder to decode an instruction to associate the tenant and the resource for monitoring, the instruction having a format including a first operand to indicate a level in the tenant hierarchy at which to monitor the resource and a second operand to indicate the resource. The processor may also include a decoder to decode an instruction to associate the tenant and the resource for controlling, the instruction having a format including a first operand to indicate a level in the tenant hierarchy at which to control the resource, a second operand to indicate the resource, and third operand to indicate a quality-of-service policy to apply to controlling the resource. Controlling the resource may be based on a more restrictive of a first allocation at a level in the tenant hierarchy of the tenant and a second allocation at a level of the tenant hierarchy of an owner of the tenant.

In embodiments, a method includes storing a first one or more values in a first one or more registers of a processor to define a tenant hierarchy; storing a second one or more values in a second one or more registers of the processor to specify a location of a thread corresponding to a tenant within the tenant hierarchy; including, by circuitry in a core of the processor, the second one or more values in a request to access a resource; and monitoring or controlling use of the resource based on the location of the tenant within the tenant hierarchy.

Any such embodiments may include any or any combination of the following aspects. The method may also include associating the tenant and the resource for monitoring, including indicating a level in the tenant hierarchy at which to monitor the resource. The method may also include associating the tenant and the resource for controlling, including indicating a level in the tenant hierarchy at which to control the resource. The method may also include associating the tenant and the resource for controlling, including indicating a quality-of-service policy to apply to controlling the resource. Controlling the resource is based on a more restrictive of a first allocation at a level in the tenant hierarchy of the tenant and a second allocation at a level in the tenant hierarchy of an owner of the tenant.

In embodiments, a system includes a processor having circuitry to execute threads, registers to store first values to define a tenant hierarchy, registers to store second values to specify a location of a thread corresponding to a tenant within the tenant hierarchy, and circuitry to include the second values in a request to access a resource; and an agent to monitor or control use of the resource based on the location of the tenant within the tenant hierarchy.

Any such embodiments may include any or any combination of the following aspects. The agent may be to determine the location of the tenant within the tenant hierarchy based on the second one or more values in the request. The agent may be to control the resource based on a more restrictive of a first allocation at a level in the tenant hierarchy of the tenant and a second allocation at a level in the tenant hierarchy of an owner of the tenant.

In embodiments, an apparatus may include means for performing any function disclosed herein. In embodiments, an apparatus may include a data storage device that stores code that when executed by a hardware processor causes the hardware processor to perform any method disclosed herein. In embodiments, an apparatus may be as described in the detailed description. In embodiments, a method may be as described in the detailed description. In embodiments, a non-transitory machine-readable medium may store instructions that when executed by a machine causes the machine to perform a method including any method disclosed herein. Embodiments may include any details, features, etc. or combinations of details, features, etc. described in this specification.

Example Core Architectures, Processors, and Computer Architectures

The figures below detail example architectures and systems to implement embodiments of the above.

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Example core architectures are described next, followed by descriptions of example processors and computer architectures.

Example Core Architectures

In-Order and Out-of-Order Core Block Diagram

Figure 4A:
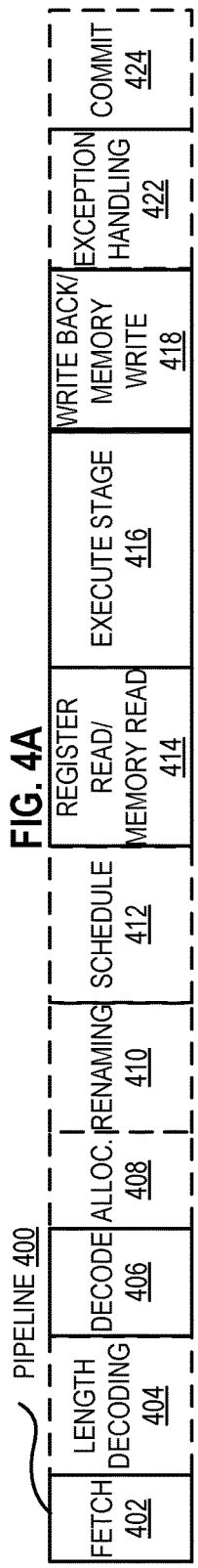
FIG. 4A is a block diagram illustrating both an example in-order pipeline and an example register renaming, out-of-order issue/execution pipeline according to embodiments.
Figure 4B:
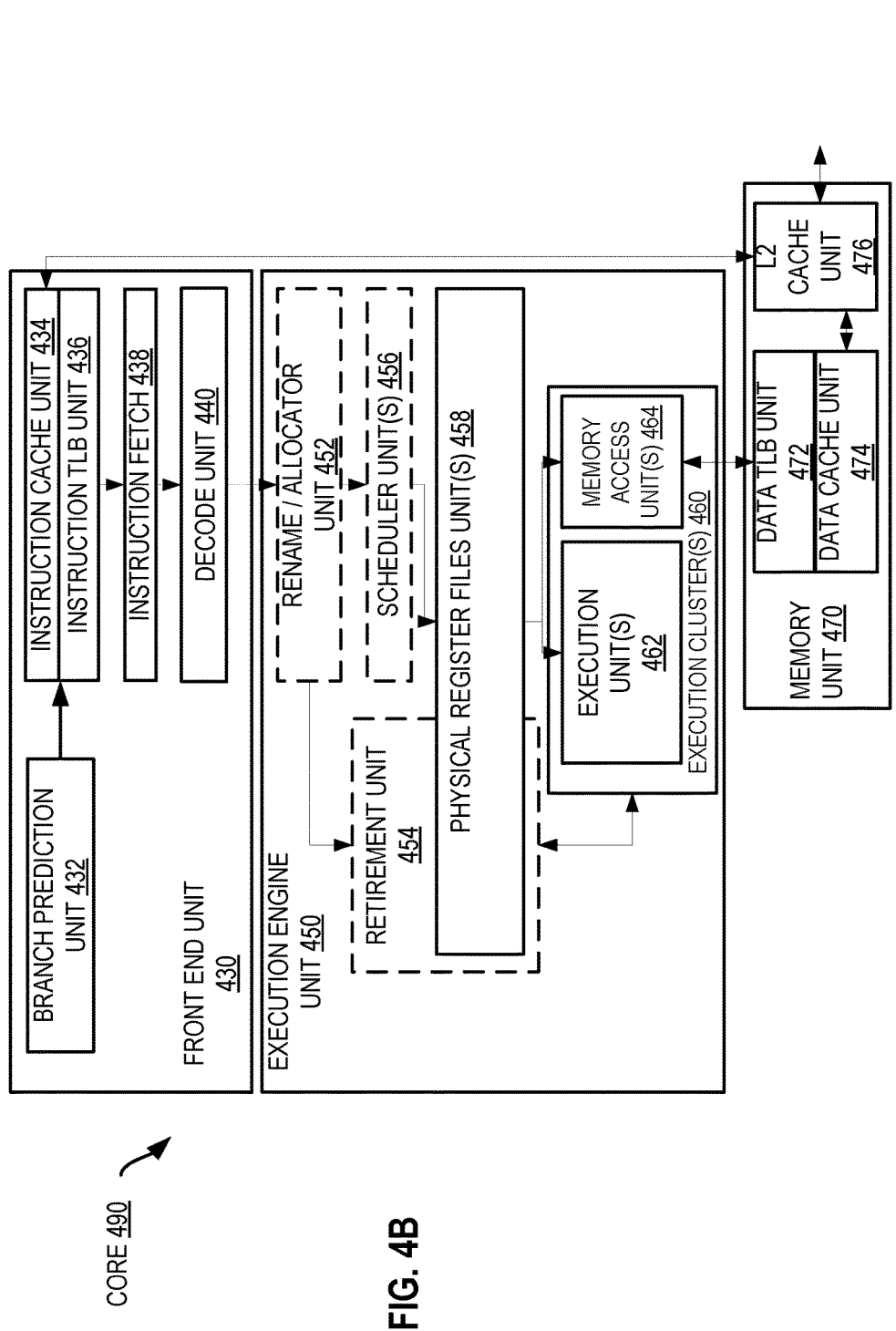
FIG. 4B is a block diagram illustrating both an example embodiment of an in-order architecture core and an example register renaming, out-of-order issue/execution architecture core to be included in a processor according to embodiments.

FIG. 4A is a block diagram illustrating both an example in-order pipeline and an example register renaming, out-of-order issue/execution pipeline according to embodiments of the invention. FIG. 4B is a block diagram illustrating both an example embodiment of an in-order architecture core and an example register renaming, out-of-order issue/execution architecture core to be included in a processor according to embodiments of the invention. The solid lined boxes in FIGS. 4A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

FIG. 4B shows processor core 490 including a front-end unit 430 coupled to an execution engine unit 450, and both are coupled to a memory unit 470. The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, coprocessor core, general purpose computing graphics processing unit (GPGPU) core, graphics core, or the like.

The front-end unit 430 includes a branch prediction unit 432, which is coupled to an instruction cache unit 434, which is coupled to an instruction translation lookaside buffer (TLB) 436, which is coupled to an instruction fetch unit 438, which is coupled to a decode unit 440. The decode unit 440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 490 includes a microcode ROM or other medium that stores microcode for certain macroinstructions (e.g., in decode unit 440 or otherwise within the front-end unit 430). The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 458 comprises a vector registers unit, a write mask registers unit, and a scalar registers unit. These register units may provide architectural vector registers, vector mask registers, and general-purpose registers. The physical register file(s) unit 458 is overlapped by the retirement unit 454 to illustrate various ways in which register renaming and out-of-order execution may be implemented (e.g., using a reorder buffer(s) and a retirement register file(s); using a future file(s), a history buffer(s), and a retirement register file(s); using a register map and a pool of registers; etc.). The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one example embodiment, the memory access units 464 may include a load unit, a store address unit, and a store data unit, each of which is coupled to the data TLB unit 472 in the memory unit 470. The instruction cache unit 434 is further coupled to a level 2 (L2) cache unit 476 in the memory unit 470. The L2 cache unit 476 is coupled to one or more other levels of cache and eventually to a main memory.

By way of example, the example register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 5:
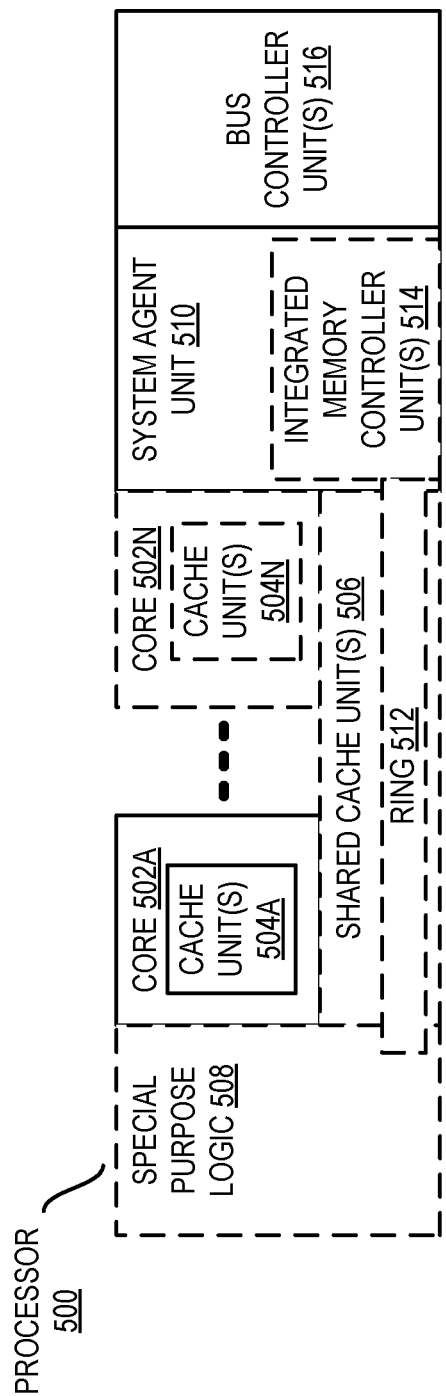
FIG. 5 is a block diagram of a processor that may have more than one core, may have an integrated memory controller, and may have integrated graphics according to embodiments.

FIG. 5 is a block diagram of a processor 500 that may have more than one core, may have an integrated memory controller, and may have integrated graphics according to embodiments of the invention. The solid lined boxes in FIG. 5 illustrate a processor 500 with a single core 502A, a system agent 510, a set of one or more bus controller units 516, while the optional addition of the dashed lined boxes illustrates an alternative processor 500 with multiple cores 502A-N, a set of one or more integrated memory controller unit(s) 514 in the system agent unit 510, and special purpose logic 508.

Thus, different implementations of the processor 500 may include: 1) a CPU with the special purpose logic 508 being integrated graphics and/or scientific (throughput) logic (which may include one or more cores), and the cores 502A-N being one or more general purpose cores (e.g., general purpose in-order cores, general purpose out-of-order cores, a combination of the two); 2) a coprocessor with the cores 502A-N being a large number of special purpose cores intended primarily for graphics and/or scientific (throughput); and 3) a coprocessor with the cores 502A-N being a large number of general purpose in-order cores. Thus, the processor 500 may be a general-purpose processor, coprocessor, or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 500 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 506, and external memory (not shown) coupled to the set of integrated memory controller units 514. The set of shared cache units 506 may include one or more mid-level caches, such as level 2 (L2), level 3 (L3), level 4 (L4), or other levels of cache, a last level cache (LLC), and/or combinations thereof. While in one embodiment a ring-based interconnect unit 512 interconnects the integrated graphics logic 508 (integrated graphics logic 508 is an example of and is also referred to herein as special purpose logic), the set of shared cache units 506, and the system agent unit 510/integrated memory controller unit(s) 514, alternative embodiments may use any number of well-known techniques for interconnecting such units. In one embodiment, coherency is maintained between one or more cache units 506 and cores 502A-N.

In some embodiments, one or more of the cores 502A-N are capable of multi-threading. The system agent 510 includes those components coordinating and operating cores 502A-N. The system agent unit 510 may include for example a power control unit (PCU) and a display unit. The PCU may be or include logic and components needed for regulating the power state of the cores 502A-N and the integrated graphics logic 508. The display unit is for driving one or more externally connected displays.

The cores 502A-N may be homogenous or heterogeneous in terms of architecture instruction set; that is, two or more of the cores 502A-N may be capable of execution the same instruction set, while others may be capable of executing only a subset of that instruction set or a different instruction set.

Example Computer Architectures

FIGS. 6-9 are block diagrams of example computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, handheld devices, and various other electronic devices, are also suitable. In general, a huge variety of systems or electronic devices capable of incorporating a processor and/or other execution logic as disclosed herein are generally suitable.

Figure 6:
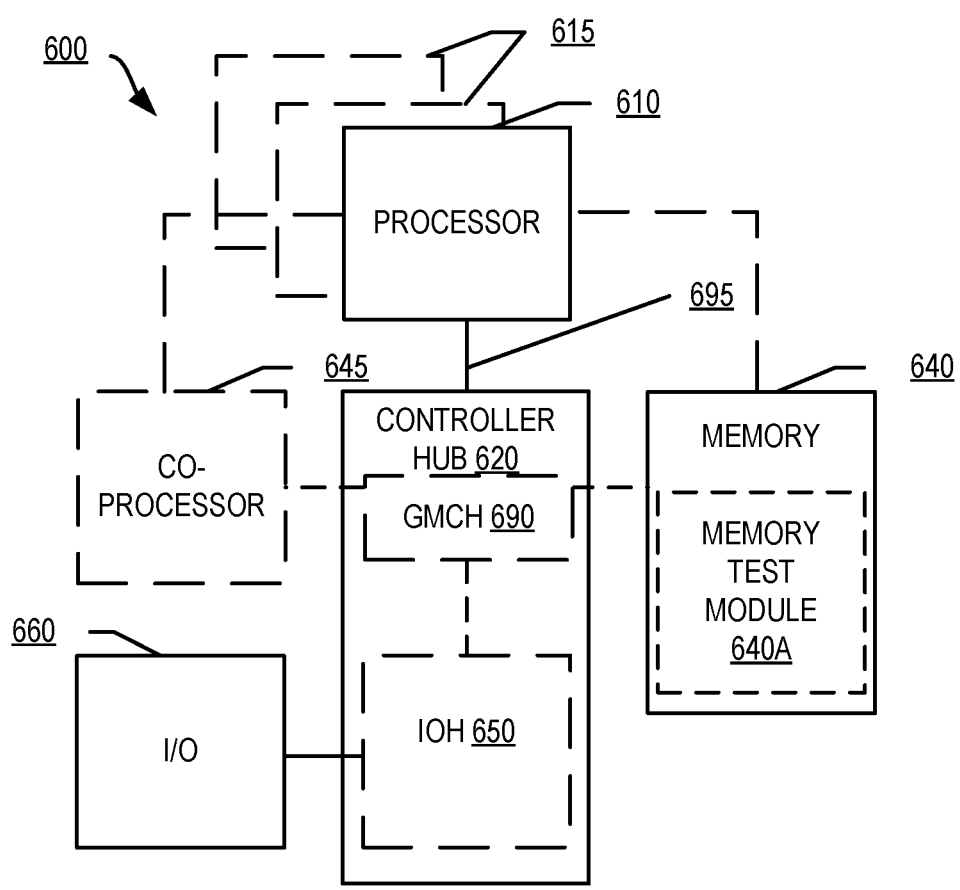
FIG. 6 is a block diagram of a system according to embodiments.

Referring now to FIG. 6, shown is a block diagram of a system 600 in accordance with one embodiment of the present invention. The system 600 may include one or more processors 610, 615, which are coupled to a controller hub 620. In one embodiment, the controller hub 620 includes a graphics memory controller hub (GMCH) 690 and an Input/Output Hub (IOH) 650 (which may be on separate chips); the GMCH 690 includes memory and graphics controllers to which are coupled memory 640 and a coprocessor 645; the IOH 650 couples input/output (I/O) devices 660 to the GMCH 690. Alternatively, one or both of the memory and graphics controllers are integrated within the processor (as described herein), the memory 640 and the coprocessor 645 are coupled directly to the processor 610, and the controller hub 620 in a single chip with the IOH 650.

The optional nature of additional processors 615 is denoted in FIG. 6 with broken lines. Each processor 610, 615 may include one or more of the processing cores described herein and may be some version of the processor 500.

The memory 640 may be, for example, dynamic random-access memory (DRAM), phase change memory (PCM), or a combination of the two. For at least one embodiment, the controller hub 620 communicates with the processor(s) 610, 615 via a multi-drop bus, such as a frontside bus (FSB), point-to-point interface such as QuickPath Interconnect (QPI), or similar connection 695.

In one embodiment, the coprocessor 645 is a special-purpose processor, such as, for example, a high-throughput MIC processor, a network or communication processor, compression engine, graphics processor, GPGPU, embedded processor, or the like. In one embodiment, controller hub 620 may include an integrated graphics accelerator.

There can be a variety of differences between the physical resources 610, 615 in terms of a spectrum of metrics of merit including architectural, microarchitectural, thermal, power consumption characteristics, and the like.

In one embodiment, the processor 610 executes instructions that control data processing operations of a general type. Embedded within the instructions may be coprocessor instructions. The processor 610 recognizes these coprocessor instructions as being of a type that should be executed by the attached coprocessor 645. Accordingly, the processor 610 issues these coprocessor instructions (or control signals representing coprocessor instructions) on a coprocessor bus or other interconnect, to coprocessor 645. Coprocessor(s) 645 accept and execute the received coprocessor instructions.

Figure 7:
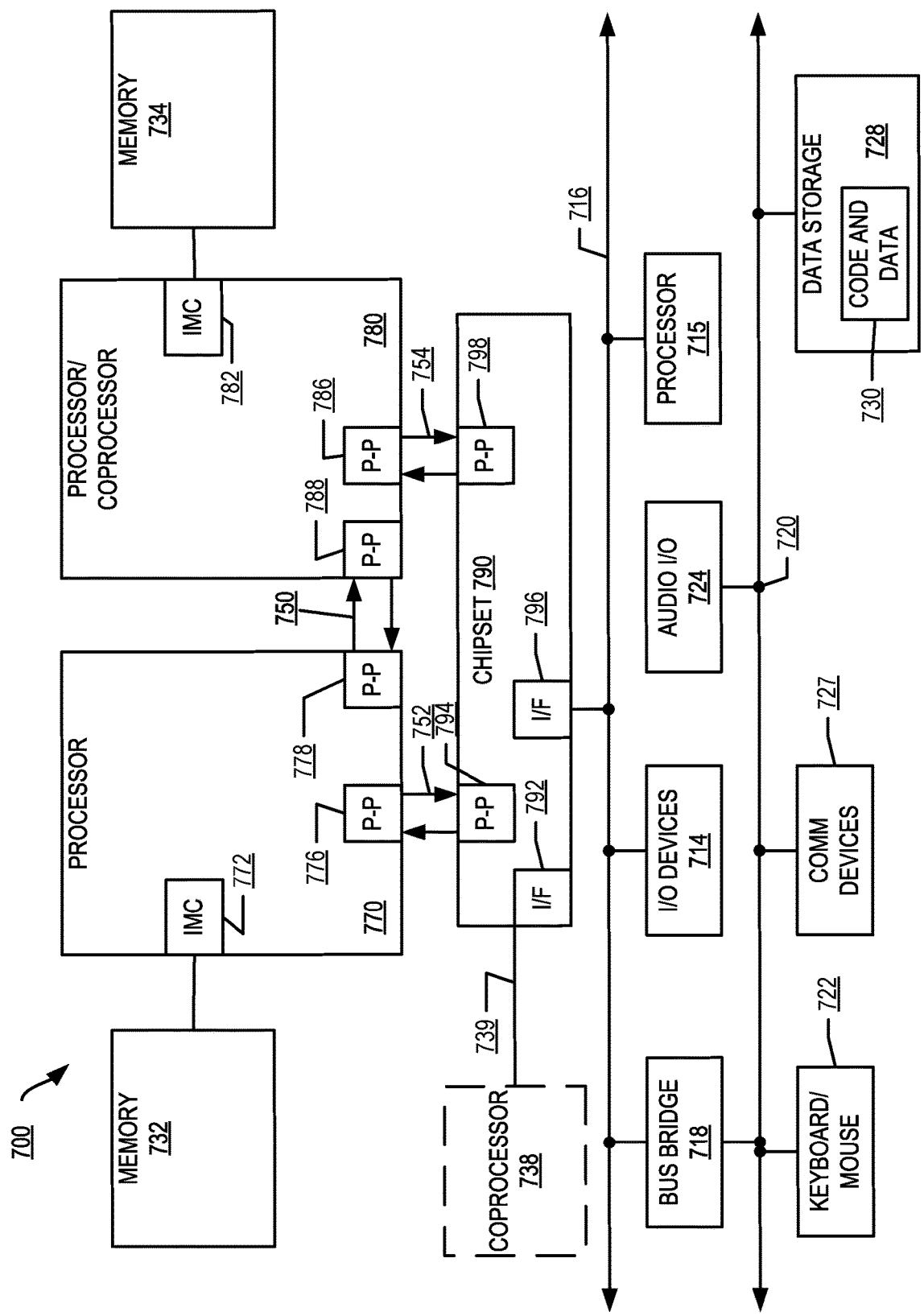
FIG. 7 is a block diagram of a system according to embodiments.

Referring now to FIG. 7, shown is a block diagram of a first more specific example system 700 in accordance with an embodiment of the present invention. As shown in FIG. 7, multiprocessor system 700 is a point-to-point interconnect system, and includes a first processor 770 and a second processor 780 coupled via a point-to-point interconnect 750. Each of processors 770 and 780 may be some version of the processor 500. In one embodiment of the invention, processors 770 and 780 are respectively processors 610 and 615, while coprocessor 738 is coprocessor 645. In another embodiment, processors 770 and 780 are respectively processor 610 and coprocessor 645.

Processors 770 and 780 are shown including integrated memory controller (IMC) units 772 and 782, respectively. Processor 770 also includes as part of its bus controller unit's point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may optionally exchange information with the coprocessor 738 via a high-performance interface 792. In one embodiment, the coprocessor 738 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present invention is not so limited.

As shown in FIG. 7, various I/O devices 714 may be coupled to first bus 716, along with a bus bridge 718 which couples first bus 716 to a second bus 720. In one embodiment, one or more additional processor(s) 715, such as coprocessors, high-throughput MIC processors, GPGPU's, accelerators (such as, e.g., graphics accelerators or digital signal processing (DSP) units), field programmable gate arrays, or any other processor, are coupled to first bus 716. In one embodiment, second bus 720 may be a low pin count (LPC) bus. Various devices may be coupled to a second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to the second bus 720. Note that other architectures are possible. For example, instead of the point-to-point architecture of FIG. 7, a system may implement a multi-drop bus or other such architecture.

Figure 8:
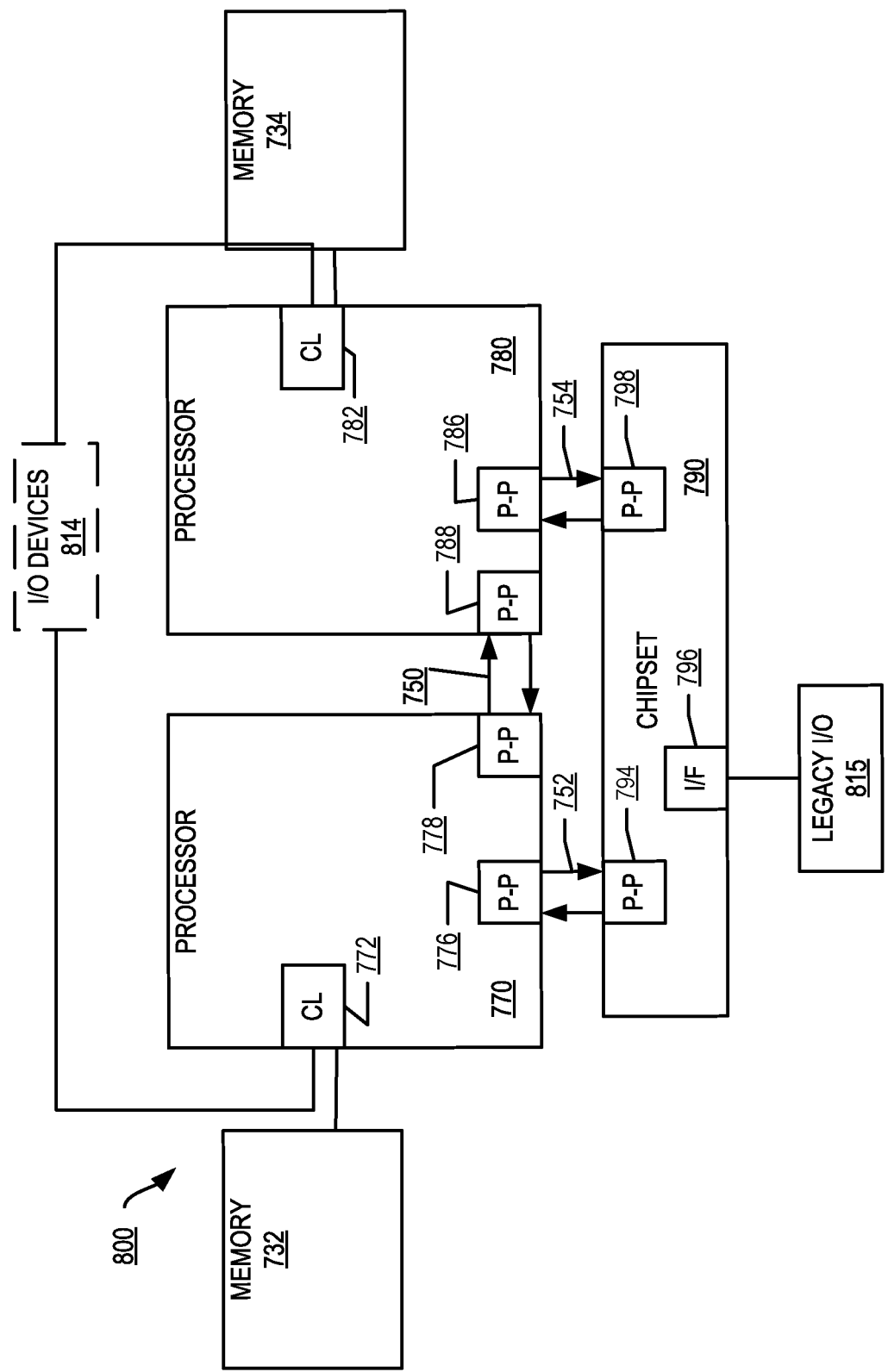
FIG. 8 is a block diagram of a system according to embodiments.

Referring now to FIG. 8, shown is a block diagram of a second more specific example system 800 in accordance with an embodiment of the present invention. Like elements in FIGS. 7 and 8 bear like reference numerals, and certain aspects of FIG. 7 have been omitted from FIG. 8 in order to avoid obscuring other aspects of FIG. 8.

FIG. 8 illustrates that the processors 770, 780 may include integrated memory and I/O control logic ("CL") 772 and 782, respectively. Thus, the CL 772, 782 include integrated memory controller units and include I/O control logic. FIG. 8 illustrates that not only are the memories 732, 734 coupled to the CL 772, 782, but also that I/O devices 814 are also coupled to the control logic 772, 782. Legacy I/O devices 815 are coupled to the chipset 790.

Figure 9:
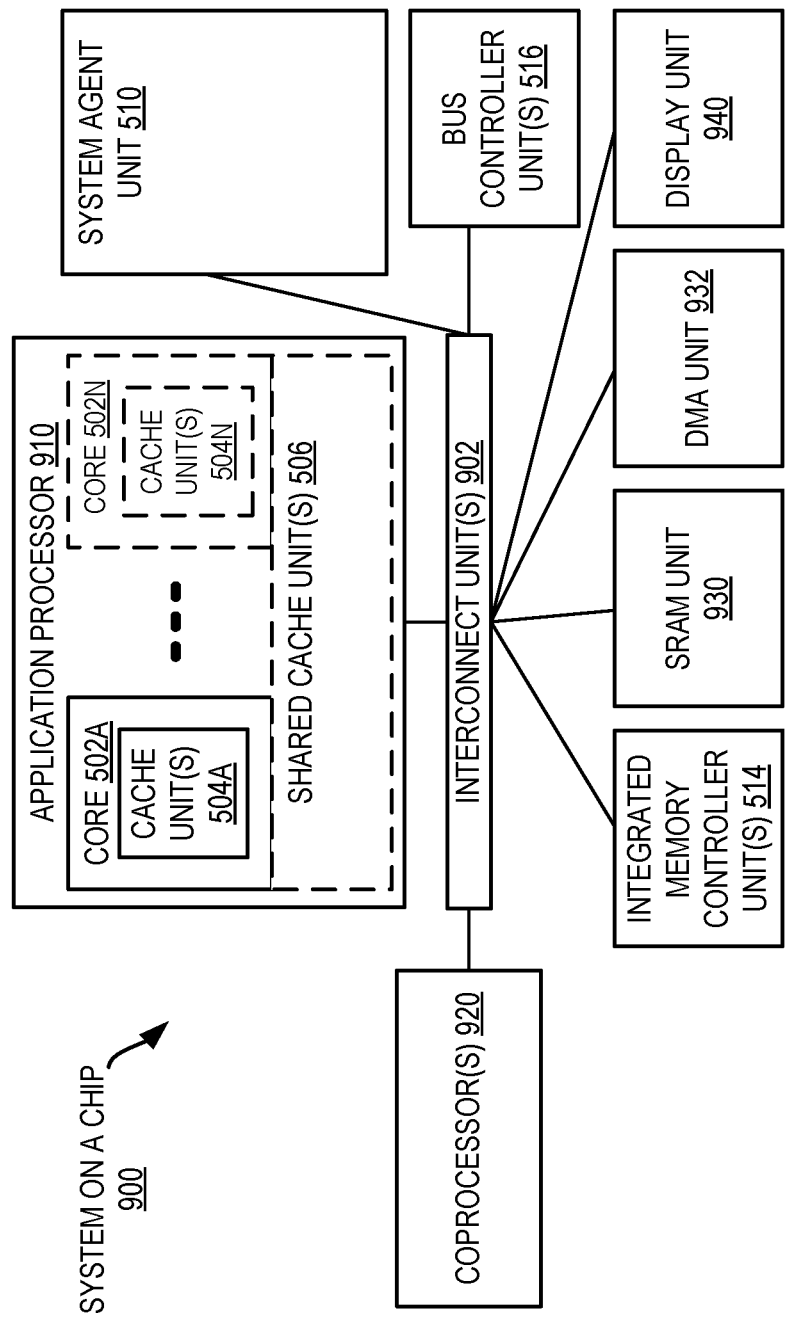
FIG. 9 is a block diagram of a system-on-a-chip according to embodiments.

Referring now to FIG. 9, shown is a block diagram of a SoC 900 in accordance with an embodiment of the present invention. Similar elements in FIG. 5 bear like reference numerals. Also, dashed lined boxes are optional features on more advanced SoCs. In FIG. 9, an interconnect unit(s) 902 is coupled to: an application processor 910 which includes a set of one or more cores 502A-N, which include cache units 504A-N, and shared cache unit(s) 506; a system agent unit 510; a bus controller unit(s) 516; an integrated memory controller unit(s) 514; a set or one or more coprocessors 920 which may include integrated graphics logic, an image processor, an audio processor, and a video processor; a static random access memory (SRAM) unit 930; a direct memory access (DMA) unit 932; and a display unit 940 for coupling to one or more external displays. In one embodiment, the coprocessor(s) 920 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 730 illustrated in FIG. 7, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations (known as "IP cores") may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In this specification, operations in flow diagrams may have been described with reference to example embodiments of other figures. However, it should be understood that the operations of the flow diagrams may be performed by embodiments of the invention other than those discussed with reference to other figures, and the embodiments of the invention discussed with reference to other figures may perform operations different than those discussed with reference to flow diagrams. Furthermore, while the flow diagrams in the figures show a particular order of operations performed by certain embodiments of the invention, it should be understood that such order is for example (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A processor comprising:
   execution circuitry to execute one or more threads;
   a first one or more registers to store a first one or more values to define a tenant hierarchy, wherein at least one of the first one or more values includes a plurality of bitstrings, each of the plurality of bitstrings corresponds to a level in the tenant hierarchy, and the plurality of bitstrings includes at least one bitstring of consecutive ones and at least one bitstring of consecutive zeroes;
   a second one or more registers to store a second one or more values to specify a location of a thread corresponding to a tenant within the tenant hierarchy; and
   address generation circuitry to include the second one or more values in a request to access a resource, wherein use of the resource is to be monitored or controlled based on the location of the tenant within the tenant hierarchy.

2. The processor of claim 1, wherein at least one of the second one or more values is to identify the tenant.

3. The processor of claim 2, wherein at least one of the second one or more values is to identify an owner of the tenant.

4. The processor of claim 2, wherein at least one of the second one or more values is to identify a level in the tenant hierarchy of the tenant.

5. The processor of claim 1, wherein the one or more second values included in the request is to be used by an agent to determine the location of the tenant in the tenant hierarchy, wherein the agent is to monitor use of the resource by the thread.

6. The processor of claim 1, wherein the one or more second values included in the request is to be used by an agent to determine the location of the tenant in the tenant hierarchy, wherein the agent is to control use of the resource by the thread.

7. The processor of claim 1, further comprising a decoder to decode an instruction to program the first one or more registers, the instruction having a format including an operand to indicate at least one of the first one or more values.

8. The processor of claim 1, further comprising a decoder to decode an instruction to associate the tenant and the resource for monitoring, the instruction having a format including a first operand to indicate a level in the tenant hierarchy at which to monitor the resource and a second operand to indicate the resource.

9. The processor of claim 1, further comprising a decoder to decode an instruction to associate the tenant and the resource for controlling, the instruction having a format including a first operand to indicate a level in the tenant hierarchy at which to control the resource, a second operand to indicate the resource, and third operand to indicate a quality-of-service policy to apply to controlling the resource.

10. A method comprising:
    storing a first one or more values in a first one or more registers of a processor to define a tenant hierarchy, wherein at least one of the first one or more values includes a plurality of bitstrings, each of the plurality of bitstrings corresponds to a level in the tenant hierarchy, and the plurality of bitstrings includes at least one bitstring of consecutive ones and at least one bitstring of consecutive zeroes;
    storing a second one or more values in a second one or more registers of the processor to specify a location of a thread corresponding to a tenant within the tenant hierarchy;
    including, by circuitry in a core of the processor, the second one or more values in a request to access a resource; and
    monitoring or controlling use of the resource based on the location of the tenant within the tenant hierarchy.

11. The method of claim 10, further comprising associating the tenant and the resource for monitoring, including indicating a level in the tenant hierarchy at which to monitor the resource.

12. The method of claim 10, further comprising associating the tenant and the resource for controlling, including indicating a level in the tenant hierarchy at which to control the resource.

13. The method of claim 10, further comprising associating the tenant and the resource for controlling, including indicating a quality-of-service policy to apply to controlling the resource.

14. A system comprising:
a processor including:
- execution circuitry to execute one or more threads;
- a first one or more registers to store a first one or more values to define a tenant hierarchy, wherein at least one of the first one or more values includes a plurality of bitstrings, each of the plurality of bitstrings corresponds to a level in the tenant hierarchy, and the plurality of bitstrings includes at least one bitstring of consecutive ones and at least one bitstring of consecutive zeroes;
- a second one or more registers to store a second one or more values to specify a location of a thread corresponding to a tenant within the tenant hierarchy; and
- address generation circuitry to include the second one or more values in a request to access a resource; and an agent to monitor or control use of the resource based on the location of the tenant within the tenant hierarchy.

15. The system of claim 14, wherein the agent is to determine the location of the tenant within the tenant hierarchy based on the second one or more values in the request.

* * * * *